US009889419B2

(12) United States Patent
Mairesse et al.

(10) Patent No.: US 9,889,419 B2
(45) Date of Patent: Feb. 13, 2018

(54) MANAGEMENT OF THE CHARGING OF A REACTOR WITH SOLID PARTICLES

(71) Applicant: TOTAL RAFFINAGE CHIMIE, Courbevoie (FR)

(72) Inventors: Julien Mairesse, La Reole (FR); Pascal Leroy, Montivilliers (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 194 days.

(21) Appl. No.: 14/435,978

(22) PCT Filed: Oct. 28, 2013

(86) PCT No.: PCT/FR2013/052570
§ 371 (c)(1),
(2) Date: Apr. 15, 2015

(87) PCT Pub. No.: WO2014/068232
PCT Pub. Date: May 8, 2014

(65) Prior Publication Data

US 2015/0336063 A1 Nov. 26, 2015

(30) Foreign Application Priority Data

Oct. 29, 2012 (FR) ..................................... 12 60313

(51) Int. Cl.
*G05B 13/04* (2006.01)
*B01J 8/00* (2006.01)

(52) U.S. Cl.
CPC ............... *B01J 8/002* (2013.01); *B01J 8/003* (2013.01); *G05B 13/04* (2013.01);
(Continued)

(58) Field of Classification Search
CPC . G05B 13/04; B01J 8/002; B01J 8/003; B01J 2208/0061; B01J 2208/00654; B01J 2208/00752
See application file for complete search history.

(56) References Cited

U.S. PATENT DOCUMENTS 5,296,202 A * 3/1994 Souers .............. B65G 69/0458 414/301
5,687,780 A * 11/1997 Minami .................. B01J 8/002 141/1

(Continued)

FOREIGN PATENT DOCUMENTS

EP 0 727 250 A2 8/1996
FR 2 872 497 A1 1/2006

(Continued)

OTHER PUBLICATIONS

International Search Report for PCT/FR2013/052570 dated Feb. 12, 2014.

(Continued)

*Primary Examiner* — Shogo Sasaki
(74) *Attorney, Agent, or Firm* — Sughrue Mion, PLLC

(57) ABSTRACT

A method for managing the charging of a space with solid particles, comprising: modelling an expected charging profile over a charging duration, during the charging, receiving, from at least one sensor, measured values of a parameter indicative of the height of a bed of solid particles charged into the space, determining filtered values of the parameter indicative of the height from the measured values received and from the modelled charging profile, and transmitting the filtered values to control the charging with solid particles.

11 Claims, 4 Drawing Sheets

(52) U.S. Cl.
CPC .................. *B01J 2208/0061* (2013.01); *B01J 2208/00654* (2013.01); *B01J 2208/00752* (2013.01)

(56) References Cited

U.S. PATENT DOCUMENTS

| | | | | |
|---|---|---|---|---|
| 5,758,699 | A * | 6/1998 | Haquet .................... | B01J 8/002 141/286 |
| 7,878,428 | B2 * | 2/2011 | Pinon ...................... | B01J 8/002 239/684 |
| 2007/0297880 | A1 | 12/2007 | Pinon et al. | |
| 2013/0025739 | A1 | 1/2013 | Cottard et al. | |

FOREIGN PATENT DOCUMENTS

| | | | |
|---|---|---|---|
| FR | 2 954 302 | A1 | 6/2011 |
| JP | 2002-48521 | A | 2/2002 |
| WO | 2008/109671 | A2 | 9/2008 |
| WO | 2009/098372 | A1 | 8/2009 |

OTHER PUBLICATIONS

French Search Report for FR 12 60313 dated Jun. 13, 2013.
Chinese Office Action issued in corresponding Chinese Application No. 201380056581.4 dated May 5, 2016.

* cited by examiner

MANAGEMENT OF THE CHARGING OF A REACTOR WITH SOLID PARTICLES

CROSS REFERENCE TO RELATED APPLICATIONS

This application is a National Stage of International Application No. PCT/FR2013/052570 filed Oct. 28, 2013, claiming priority based on French Patent Application No. 12 60313 filed Oct. 29, 2012, the contents of all of which are incorporated herein by reference in their entirety.

The invention relates to the management of the charging of a vessel, particularly a reactor, with solid particles.

It is known practice to charge reactors, notably of the chemical, electrochemical, petroleum or petrochemical type, with solid particles in the divided state. These particles may for example take the form of beads, grains, cylinders, pellets, sticks or any other shape and generally are of relatively small size.

The particles may in particular be grains of solid catalyst generally extruded and produced either as even shapes or in the form of single or multi-lobe sticks the dimensions of which may vary as the case may be from a few tenths of a millimeter to a few centimeters.

It is to this application referred to as "dense charging" of grains of catalyst into a chemical reactor that reference will more particularly be made in what follows of the present description. However, the device described may more generally be applied to the case of a charging of solid particles into a reactor or some other vessel, notably a cylindrical one.

What is meant by "dense charging" is charging by an optimized freefall effect so as to allow a target quantity of solid particles to be charged homogenously and as uniformly as possible into a given space in a minimum amount of time.

For best management of the charging of the vessel, notably when the charging needs to be dense, it is known practice to position a probe inside the vessel in order to obtain measured values of the height of the bed of solid particles charged.

For example, document US 2008/0216918 (Comardo et al.) describes a device for the distribution of solid particles, of the type to which the invention relates, on which a laser source and a detector in communication with a computer are mounted. The computer receives signals from this detector and by triangulation determines values for the height of the catalytic bed. Processing is carried out in order to eliminate the noise associated with the dust or with the particles that are in the process of falling. For example, given measured values are accepted only if they tally with later measured values. The measured values retained are displayed on the screen of a computer. This computer also transmits control signals to the distribution device for controlling the charging.

Also, document EP0727250 (JEC) describes a laser scanner fixed to a lateral wall and a camera for detecting reflected light. The surface of the bed is divided into small squares and each square is scanned one after the other. A computer calculates bed height values using trigonometry. Image processing is used to process the volume of data received, obtain sufficient precision and distinguish particles that are in the process of falling from particles that have been deposited.

There is a need for better management of dense charging.

There is proposed a method for managing the charging of a vessel, for example a reactor, with solid particles, comprising:

- storing in a memory a model of an expected charging profile over a charging duration,
- during the charging, receiving from at least one sensor, measured values of a parameter indicative of the height of a bed of solid particles charged into the vessel,
- determining filtered values of the parameter indicative of the height from the measured values received and from the modeled charging profile, and
- transmitting these filtered vales to a charging control means so as to formulate, as a function of said filtered values, a signal for controlling the charging with solid particles.

Thus, by taking as basis a model of the expected charging profile it is possible to obtain values of the parameter indicative of the height that are more reliable than in the prior art, in which the basis is solely earlier measured values, thus making it possible to have better management of the charging.

The expected variations of a parameter indicative of the charging height are modeled and this model is used to modify or eliminate measured values, something which may for example make it possible to avoid basing control of the charging on erroneous values when the error introduced changes slowly, as would be the case with the method of the prior art described above.

The invention is not in any way restricted by the way in which this model is taken into consideration in determining the filtered values of the parameter indicative of the height.

For example, it is possible to contemplate correcting or eliminating measured values that diverge too greatly from the corresponding modeled values.

The model of the expected charging profile over the charging duration may, for example, comprise values of the parameter indicative of the height and values of a time parameter, associated in pairs, for example in the form of a table. It is also possible to contemplate storing simply values that will make it possible to characterize a curve in a frame of reference with time on the abscissa axis and on the ordinate axis the parameter indicative of the height, for example a director coefficient of a straight line and the coordinates of a point on this straight line. In particular, the method described hereinabove may make it possible to perform charging more quickly than in the prior art, something which may be crucial notably when the vessel is a petrochemical reactor in a refinery.

The invention may allow a reactor to be densely charged with solid particles automatically or near-automatically. In particular, the invention may make it possible to avoid intermittently interrupting charging in order to perform a manual check on the height and level of the bed of particles.

Thanks to this improvement in reliability and charging time, the down-time of the relevant unit may be shorter than in the prior art. The invention may thus find a particularly advantageous application in a refinery because any unit down-time represents a significant loss of income.

It may for example be possible to contemplate displaying, for example on the screen of a monitoring computer, the current values of the parameter indicative of the height, for example a measured charging profile or, quite simply, numerical values of height.

The method may thus comprise a step of displaying the filtered values of the parameter indicative of the height.

The method may potentially comprise a step of processing, carried out for example by the control means, which consists in formulating a charging control signal, as a function of the filtered values of the parameter indicative of the height. For example it is possible to determine a desired flow rate value from filtered height values so as to guarantee an optimized charging density, and/or a control signal for controlling the openings of the charging device and/or other things. The invention is not of course restricted to creating automatic control of the opening of the particle distribution device. The method may, for example, be confined to displaying the filtered height values so that it is up to the operator to control the flow rate of the charging with solid particles. The control means may then comprise the screen, and formulation of the control signal may be performed by a human operator.

The word "signal" means both an electrical signal, for example a digital or analogue signal, and a signal of some other nature. The invention is not in any way restricted by the nature of the signals used.

The invention is not restricted by the nature of the parameter indicative of the height. This parameter may for example comprise a height of the charged bed of solid particles or alternatively may comprise a distance between a sensor and this bed.

Neither is the invention restricted by the way in which the charging profile is modeled. For example, it is possible to contemplate modeling:

- a theoretical charging profile, as a function of the shape of the vessel, the flow rate of the solid particles, an expected density value and/or the type of solid particles charged, and/or
- an experimental charging profile obtained from filtered values of the parameter indicative of the height determined at previous instants and, possibly, of the shape of the vessel and/or the flow rate of solid particles. The shape of the vessel and/or the flow rate of solid particles may be used to choose a linear or nonlinear regression model. Stated differently, the assumption that such or such a type of function connects the parameter indicative of the height and the charging time, for example a polynomial or some other function, is made on the basis of the shape of the vessel and/or the flow rate of the solid particles.

Thus, for a vessel that is cylindrical (i.e. of a cross section that does not vary with height) and for a constant flow rate, the charging profile may be expected to have the appearance of a straight line. Thus, a theoretical charging straight line and/or the charging straight line closest to previous filtered values can be determined. In the latter instance, recourse could for example be had to a linear regression and/or least squares type of method or the like. The regression straight line, for which the sum of the squares of the distances between filtered values and corresponding values on the straight line is minimal, is determined. Stated differently, attempts are made to minimize the quadratic sum of the deviations of the measurements from the predictions.

Of course, in the case of a reactor the cross section of which does vary with height and/or that has a non-constant flow rate, the function assumed to connect height with filling time may be more complex than a simple first-order polynomial function. It may for example be a second, third or higher order polynomial function and/or one with a noncontinous derivative, defined differently from one time interval to another (a function that is straight in segments for example).

Provision may be made for the filtered values to be determined by comparing measured values against values from the theoretical charging profile and/or from the experimental charging profile.

Although the invention is not restricted to the type of sensor (or probe) employed, a radar probe may advantageously be contemplated. Radar technology is in fact particularly well suited to dusty atmospheres.

Neither is the invention restricted by the number of sensors employed. Advantageously, several sensors, for example four sensors, five sensors or more will be used.

Advantageously and nonlimitingly, the method many comprise a step involving comparing at least one measured value of the parameter indicative of the height of the charging bed with at least one, for example each, previous value of this parameter, for example with at least one previously measured value of this parameter and/or at least one previous filtered value of this parameter.

Advantageously and nonlimitingly, the method may comprise, in respect of at least one and, for example, in respect of each, measured value of the parameter indicative of the height, comparing this measured value with at least one value from the modeling of the charging profile. For example, provision may be made for this value to be compared with one or more values of the theoretical charging profile corresponding to the current instant and/or to previous instants. Provision may be made for the measured value to be compared with at least one value of the experimental charging profile corresponding for example to the current instant and/or to previous instants.

Advantageously and nonlimitingly, a step may be provided that consists in comparing at least one, for example each, received measured value against at least one previous measured value, and provision may be made for the current measured value to be ignored if it turns out that the measured values have evolved too little over a given period of time. Such a situation in which the probe is frozen is in fact liable to occur and it is preferable for the corresponding values not to be taken into consideration.

Provision may be made for tolerance thresholds for these comparisons to be stored in memory.

For example, a first tolerance threshold may be provided for the comparison with the experimental charging profile.

Advantageously and nonlimitingly, the value of this first tolerance threshold may be formulated as a function of a theoretical charging rate itself obtained from the cross section of the vessel and the flow rate of solid particles, or alternatively still, as a function of an experimental charging rate obtained from previous filtered values. For example, provision may be made for this tolerance threshold to be chosen equal to twice the theoretical height charged per minute.

A second tolerance threshold may be provided for the comparison against the theoretical charging profile.

Advantageously and nonlimitingly, this second tolerance threshold may be a function of the cross section of the vessel. For example, provision may be made for this second tolerance threshold to be chosen equal to 10% of the diameter of the reactor.

In one nonlimiting embodiment, provision may be made for the measured value of the parameter indicative of the height to be compared against one or more values from one or more charging profiles only if this measured value differs too greatly from a previous value of the parameter indicative of the height, for example a previous measured value or a previous filtered value.

Advantageously and nonlimitingly, provision may be made for the or at least one of the sensors to be positioned sufficiently far away from obstacles of the thermocouple type that may be present in the vessel that such obstacles do not impede the measurement. The measured-height values may indeed fail to be relevant as a result of the presence of such obstacles. By positioning the sensors sufficiently far away from these obstacles, for example by resorting to a rigid chain or the like, the number of measurement points that do not truly correspond to a height of the charging bed can be limited.

Advantageously and nonlimitingly at least one sensor may comprise a radar probe with parabolic antenna. Such a probe, which is relatively directional, may make it easier to get around the problem of obstacles of the thermocouple type.

The invention is not of course limited to this embodiment. For example, a conical or some other form of antenna may be contemplated.

Advantageously and nonlimitingly it is possible to provide, prior to charging, a step consisting in receiving, in respect of at least one and, for example, in respect of each, of the sensors, a measured value of the parameter indicative of the height and a step consisting in determining, in respect of at least one and, for example, in respect of each, of the sensors, a height offset value.

Thus, it is assumed that, at the start of dense charging, the surface of the vessel is flat. The offset values are thus calculated such that the same height of fall corresponds to each of the sensors.

The invention is not in any way restricted to a particular way of conducting the various comparisons mentioned hereinabove.

For example, provision may be made for a value A, for example a measured value of the parameter indicative of the height, to be compared with a value B, for example a modeled value of this parameter, by:

- calculating a first value as a function of these values A and B, for example a difference between these values A and B, an absolute value of the difference between these values A and B, a ratio between these values A and B, or the like, and by
- taking different decisions according to whether or not this first value is greater than, or alternatively greater than or equal to, a threshold.

According to another example, provision may be made for a threshold value to be added to the value B, and for different decisions to be taken according to whether or not the value A is greater than such a sum.

A computer program product comprising instructions for performing the steps of the method described hereinabove when this program is executed by a processor is also proposed. This program may for example be stored on a support, for example a hard disk, be downloaded, or the like.

Also proposed is a device for managing the loading of a vessel, for example a reactor, with solid particles, comprising:

- a memory for storing a model of a charging profile expected over a charging duration,
- receiving means for receiving from at least one sensor measured values of a parameter indicative of the height of a bed of solid particles charged into the vessel,
- processing means for determining filtered values of the parameter indicative of the height from the measured values received and from the charging profile modeled and stored in memory, and
- transmission means for transmitting the filtered values of the parameter indicative of the height to a charging control means so as to formulate a signal for controlling the charging.

This device may comprise means for the digital processing of the signal. This charging management means may for example comprise or be incorporated into one or more processors, for example a microcontroller, a microprocessor or the like. For example, this device may comprise a computer or the like.

The processing means may for example comprise or be incorporated into the core of a processor or CPU (central processing unit). The receiving means may comprise an input pin, an input port or the like, and the transmission means may comprise an output pin, an output port or the like.

The device may comprise or be in communication with display means, for example a screen or more generally with a computer user interface.

The device may comprise additional processing means for modeling the charging profile which will then be stored in memory.

The memory may for example be a random access memory or RAM.

The device may comprise the control means, for example processing means able to control a distribution device as a function of filtered values of the parameter indicative of the height so as to obtain charging with a density as close as possible to a desired density value (target density), and do so in the shortest possible time.

The various processing means listed hereinabove may or may not be incorporated into one and the same chip.

Also proposed is a system for charging a vessel, notably a reactor, with solid particles, this system comprising a solid particle distribution device, at least one sensor for measuring a parameter indicative of the height of the bed of solid particles charged into the vessel, and a device for managing the charging as described hereinabove.

The invention will be better understood with reference to the figures which illustrate some nonlimiting embodiments.

Figure 1:
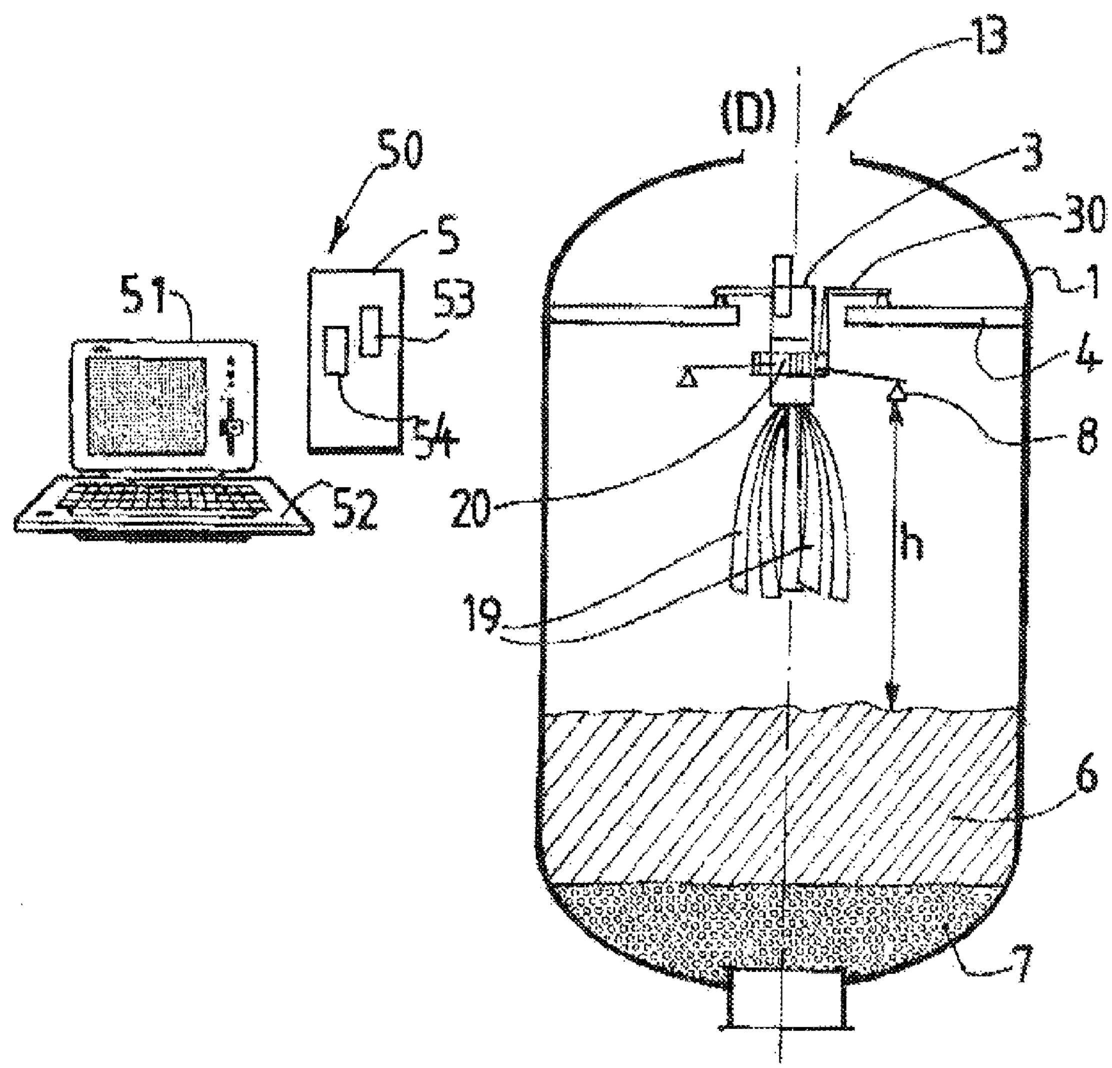
FIG. 1 shows one example of a system for charging solid particles according to one embodiment of the invention.

With reference to FIG. 1, a reactor 1 defines an opening 13 for the passage of a distribution device 3 for distributing solid particles 6, 7. The distribution device 3 may for example be of the type described in document WO 2010/076522, or, alternatively, of the type described in the unpublished application FR1255523 relating to other inventions by the applicant company, or the like.

In the example depicted, the distribution device 3 rests on a plate 4 of the reactor 1 via arms 30 mounted on a ring 20 so that they can be moved on the circumference of this ring 20. The device 3 further comprises flexible strips 19 for better spreading the solid particles.

This reactor 1 measures approximately 5 or 6 meters tall or more as the case may be and its base has a diameter of the order of 3, 4, 5 meters or more, as the case may be.

The distribution device 3 allows the reactor 1 to be charged with inert beads 6 and also with particles of catalyst 7.

This type of reactor 1 may notably be used in the petrochemical industry. It may for example be a petrochemical reactor in which a charge of hydrocarbons flows through the bed of catalyst 7 and the bed of inert beads 6. The solid particles of catalyst may be porous extruded particles usually comprising metal compounds.

Once the catalytic beds 6, 7 have been charged, the distribution device 3 is removed and a flow of hydrocarbons, which may be liquid and/or gaseous, flows through this reactor 1.

The catalytic beds 6, 7 have to be replaced regularly, for example every year, every two years, or even less frequently as the case may be, when the activity of the catalyst is no longer sufficient to ensure correct operation of the unit in which it is used; this catalyst may be definitively recycled in order possibly to recover rare metals, or alternatively may be regenerated and then charged back into the unit. For cost and productivity reasons, every attempt is made to limit the time taken to prepare the reactor 1 as much as possible.

During the charging with solid particles 6, 7, sensors 8 are installed in the reactor 1 in order to monitor the progress of the charging of the products charged into the reactor.

Products charged into the reactor or the charging of the reactor means the solid particles distributed in the reactor by the distribution device, for example the beds 6, 7 of FIG. 1, the reagents and products in the chemical sense of the word and/or the like.

The sensors 8 may for example comprise laser sensors, cameras, radars, ultrasound sensors and/or the like.

Sensors of the radar type may advantageously be chosen.

Each sensor 8 may for example be a measurement probe around 30 centimeters tall and weighing close to 2 kilograms or more as the case may be.

Even though in FIG. 1 just two sensors 8 have been depicted for legibility purposes, four or five sensors will advantageously be positioned. For example, one radar sensor (not depicted) may be arranged in a relatively central position, close to the axis (D) of symmetry of the reactor 1, while the other three of four sensors may be arranged at peripheral positions relatively distant from this axis (D).

The sensors 8 may for example make it possible to measure the level of the catalytic bed 6 by, in practice, measuring the distance at the level of the bed, and detecting any variations in level. If the filling surface exhibits a relief, then provision may be made for the distribution of the solid particles to be commanded in such a way as to remedy this relief, for example by conferring greater speed on the particles that are to be charged so that the particles fill the lateral hollows.

A charging system 13 thus comprises, in addition to the distribution device 3, a computer 50, for example of the portable or non-portable type. Of course, the invention is not restricted to any particular form of computer: a smartphone, a tablet or the like could be contemplated.

This computer 50 is in communication with each of the sensors 8 and with a control device (not depicted) for controlling the distribution device 3, via wired or wireless means, for example of the Bluetooth® type or the like. In the case of wired means, electrical connectors may allow each of the sensors to be connected to an external unit so that signals from these sensors can be read and processed. Use may for example be made of electrical wires and means of clipping these electrical wires to the charging device, notably along at least part of the rigid chain, or any other means within the competence of the person skilled in the art.

The computer 50 comprises a conventional microprocessor-based management device, for example a central processor 5. According to one other example, the management device may comprise a filtering module of a profilometry software executed by a computer processor.

This management device allows the erroneous measured values to be filtered out thus limiting errors in the interpretation of the actual charging profiles, all the while still allowing any actual charging defects to be detected.

A processor 53 allows a theoretical charging profile over a given charging duration, for example from the start of charging (t=0) to an instant corresponding to a desired final height to be calculated from a flow rate value and from at least one value of the cross-sectional area of the reactor 1. For a cylindrical reactor charged at a constant flow rate, this charging profile takes the form of a straight line, because the height of the bed 6 is expected to increase linearly with time.

Data that allows this theoretical curve to be reconstructed, for example the coordinates of a point and a director coefficient, are stored in a memory 54.

During the course of charging, the processor 53 receives, in respect of each of the sensors 5, measured values of the distance h separating this sensor 8 from the surface of the catalytic bed 6.

These measured values are compared with the modeled theoretical values from the data stored in the memory 54 in order to set aside any measured values that are not relevant.

The method implemented in this management device 5 will be described in greater detail with reference to FIG. 2.

The management device 5 thus determines filtered values of height h, using a modeled charging profile.

During the course of the charging, the four or five filtered height values corresponding to an instant t and to the four or five respective sensors 8 are compared with one another.

If, at an instant t during the course of charging, these four or five filtered height values are sufficiently close to one another, the catalytic bed is considered to be flat.

If, on the other hand, one or more filtered height values differ too greatly from the other or others, then the surface of the catalytic bed is considered to exhibit one or more relief(s).

By providing a relatively high number of sensors, for example four or five, it may be possible to estimate the shape of these reliefs from the filtered height values from these sensors. For example, if the height value h corresponding to the sensor positioned on the axis (D) is the highest of the four or five height values, then it is possible that the surface of the catalytic bed is dished.

If a relief is detected in this way then the processor 53 formulates a control signal intended for the control device. In response to this control signal, the control device:

- modifies the size of the openings of the distribution device 3, for example the dimensions of adjustable openings in the drum supplying a charging device of the type of document EP2231318, for changing the flow rate of solid particles,
- adapts the rotational speed about the axis (D) of a charging part of the distribution device 3, and/or
- an alternative.

Provision may be made for the control of the size of the distribution openings to be determined from a value of desired flow rate by resorting to a map. For example, a two-column table is stored in a memory so that an openings size value corresponds to each flow rate value. Alternatively, provision may be made for an opening size to be calculated as a function of the desired flow rate value.

Conversely, provision may be made for a current flow rate to be calculated from a control signal controlling the size of the openings, by using a map, for example of the graph or similar type.

In the event of a change in flow rate, the theoretical charging profile is updated: for example, a new director coefficient is calculated. The theoretical charging curve may thus comprise several straight-line segments, while at the same time remaining continuous.

The method implemented by the management device 5 is now explained in greater detail.

Prior to the dense charging of the layer 6, the sensors 8 are positioned under the plate 4 at variable heights. The computer 5 receives four measured height values coming respectively from the four sensors 8. As the layer 7 is assumed to be within a few centimeters of flat, an offset value is calculated for each of the probes so that, for each of the probes, the measured value from which the corresponding offset value will have been subtracted is equal to an assumed height value. This assumed height value may have been measured beforehand, or kept in memory, or the like.

However, if between two measured height values from two distinct sensors placed under the plate there is a difference that is greater than a threshold difference, for example 20 centimeters, or if between the value from the sensor positioned on the axis (D) and a value from one of the sensors placed under the plate there is a difference greater than another threshold difference, for example 40 centimeters, then the screen displays a message inviting the operator to reposition the sensors. This is because excessive variations in height at the positions of the probes could lead to erroneous values.

If, despite repositioning, one of the probes still returns a value considered to be erroneous, i.e. corresponding to a difference of more than 20 or 40 centimeters in relation to the values from the other sensors, then the management device may decide not to take the values from said probe into consideration any longer, for example by setting a flag corresponding to this probe to value one.

Figure 2:
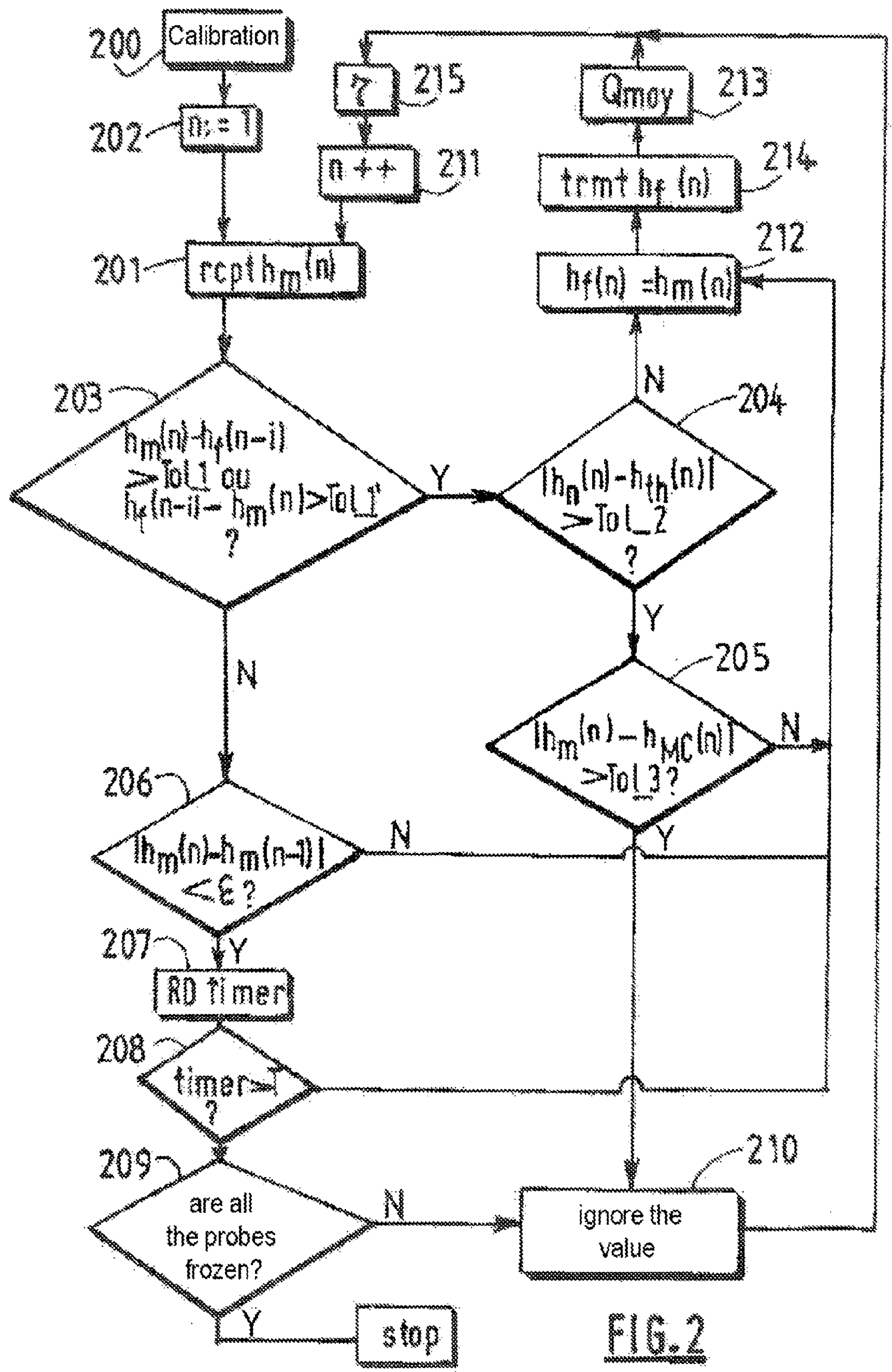
FIG. 2 is a flow diagram of one example of a method for managing the charging with solid particles according to one embodiment of the invention.

These various processing operations performed prior to charging are represented by the calibration step 200 in FIG. 2.

Loading then begins. The filtering module is programmed then to run a certain number of loops, each loop, indexed n, corresponding to a temporal sample. The flow diagram comprises a step 202 of initializing this index n.

During this step 202, an initial value $h_m(\mathbf{0})$, $h_f(\mathbf{0})$, $h_{MC}(\mathbf{0})$, etc., equal to a predetermined height of fall or height of fall determined during calibration is also assigned to each of the height variables described hereinbelow.

In the present application, the indexes m, f, th and MC have been used to denote in general values which are respectively measured, filtered, theoretical and the result of a least squares method regression.

When an nth loop is being executed, for each of the probes, a measured value of the height $h_m(n)$ is received, in a step 201.

For greater legibility, in FIG. 2, the names of the various height parameters $h_m(n)$, $h_f(n)$, $h_{MC}(n)$, etc., bear no reference to their probe of origin, but it will be appreciated that these various steps are performed for each of the probes.

During a test step 203, the current measured value $h_m(n)$ is compared against the last filtered value $h_f(n-i)$ retained. If, during the execution of the previous loop, the measured value has been retained, then i=1. If no measured value has been retained for p cycles then i=p+1.

During this test 203 a check is first of all performed to check that the measured value $h_m(n)$ is not greater than the last value retained. This is because the height values are expected to decrease with time, the height here being the distance between the probe and the bed of charged particles. A tolerance Tol_1 is, however, set because the values from probes can sometimes fluctuate slightly. The fluctuations rarely exceed 10 centimeters so a tolerance value Tol_ 1 of 15 centimeters may for example be chosen.

Alternatively, this value Tol_1 may be defined as function of the rate of the charging. For example, for a reactor charged at 5 centimeters per minute, Tol_1 may be equal to 10 centimeters.

Furthermore, a check is performed to ensure that the measured value $h_m(n)$ is not too much smaller than the previous retained value $h_f(n-i)$. For example, a tolerance value Tol_1' of 15 centimeters or of 20 centimeters for example may be chosen.

The values Tol_1, Tol_1' may or may not be equal to one another.

The method further comprises a test step 204 during which the measured value $h_m(n)$ is compared with a theoretical value $h_{th}(n)$ from a model. This theoretical value may for example be calculated from the temporal sample value n, from the coordinates of a point and from a director coefficient value which are stored in the memory 54.

In FIG. 2, the steps for determining this theoretical value of the director coefficient, of storing this value, of calculating the theoretical value $h_{th}(n)$ have not been depicted. These steps of modeling a theoretical charging profile may for example occur prior to the charging, so that when executing the test 204, the current value $h_{th}(n)$ is read from a table.

For this test 204 it is possible to choose a value Tol_2 equal to 10% of the diameter of the reactor, for example 30 centimeters.

The method further comprises a test step 205 during which the measured value $h_m(n)$ is compared with an experimental value $h_{MC}(n)$ determined from previous filtered values $h_f$. The method may in fact determine an experimental curve, for example by determining a gradient value $Q_{moy}$ from filtered values at previous instants, for example by using a method of the least squares type, and then may estimate an experimental value $h_m(n)$ corresponding to the current sample n for the curve having a director coefficient $Q_{moy}$ and a determined start point.

A tolerance value Tol_3 for example equal to the value Tol_ 1 may be chosen for this test step 205.

This test step 205 may notably make it possible to avoid eliminating values that are too far away from the previous retained value $h_f(n-i)$ and too far away from the theoretical value $h_{th}(n)$. This is because if the actual flow rate is relatively distant from the theoretical flow rate it may prove tricky to find coherent values when the probe has returned fixed values or values that are too low for a certain period of time. Catalyst has continued to be charged for this duration and the tolerance values Tol_1, Tol_1' and/or Tol_2 may then prove to be too low to make it possible to accept retaining values even though the values are correct. Comparisons in the step 205, performed in relation to a value from a calibration from previous retained values, may thus make it possible to avoid the loss of relevant measured data.

In another embodiment which has not been depicted, provision may be made for the tolerance thresholds Tol_1, etc. to be increased if no value is retained for a number of cycles, and returned to their initial value when a value is retained.

The method further comprises a test step 206 during which the measured value $h_m(n)$ is compared with a previous measured value $h_m(n-1)$. If these values are too similar then it is considered that there is a risk that the corresponding probe has frozen.

A timer is provided and started the first time it is detected that the values $h_m(n)$, $h_m(n-1)$ are too close in value and is reset to zero each time a cycle is run without such a detection.

After a step 207 of reading this timer, the value read, here denoted timer, is compared in a step 208 against a threshold T, for example 1 minute.

If it is found that the probe has been producing very similar values for over one minute, then the situation of the other probes is examined during a step 209. This step 209 may for example for each probe apply a flag indicating that this probe is frozen.

If all the probes are frozen, data acquisition is terminated and the filtering module exits the loop. If not, the current measured value $h_m(n)$ is not retained (step 210) and the device prepares to execute a next loop.

For example, the device enters a standby state for a predetermined duration, for example lasting 10 milliseconds (step 215) then the index n is incremented during a step 211.

To return to the test 206 in the embodiment depicted, this test 206 is executed only if the test 203 is negative.

If at the end of the tests 206, 208 it is found that the probe is not frozen or that the probe has been frozen for under a minute, and the current measured value $h_m(n)$ is sufficiently close to the last value retained $h_f(n-i)$, then the current value $h_m(n)$ is retained during a step 212.

In the embodiment depicted, the tests 204, 205 are executed only if the test 203 is positive, namely if the current measured value $h_m(n)$ is too far distant from the last value retained $h_f(n-i)$. More specifically, the test 205 implementing the experimental value $h_{MC}(n)$ is performed only if the test 204 employing the theoretical value $h_{th}(n)$ is positive.

If the test 204 or the test 205 is negative, then the current value $h_m(n)$ is retained during step 212.

Conversely, if these two tests 204, 205 are positive, then the current measured value $h_m(n)$ is ignored during step 210.

The invention is not in any way restricted to this wording of the various tests 203, 204, 205, 206 or of course by the form of these tests.

In particular, the steps 204, 205 of comparing against modeled values $h_{th}(n)$, $h_{MC}(n)$ may be performed systematically, for each of the samples, for example before or in parallel with the execution of the test that consists in comparing the received measured value against a previous measured value (for example the last value retained).

Returning to FIG. 2, when a value is retained, the processor updates the value of the director coefficient $Q_{moy}$ during a modeling step 213. Recourse may be had to least squares method, based on all of the previously retained values, or on the last R values retained. R may for example be equal to 10 or 100 depending on the sampling rate.

Furthermore, each retained value $h_f(n)$ is transmitted during a step 214 so that it can be displayed on a computer screen, for example in order to form, with the other filtered values, a charging curve. The filtered values may also serve to control the charging, as explained with reference to FIG. 1.

Figure 3A:
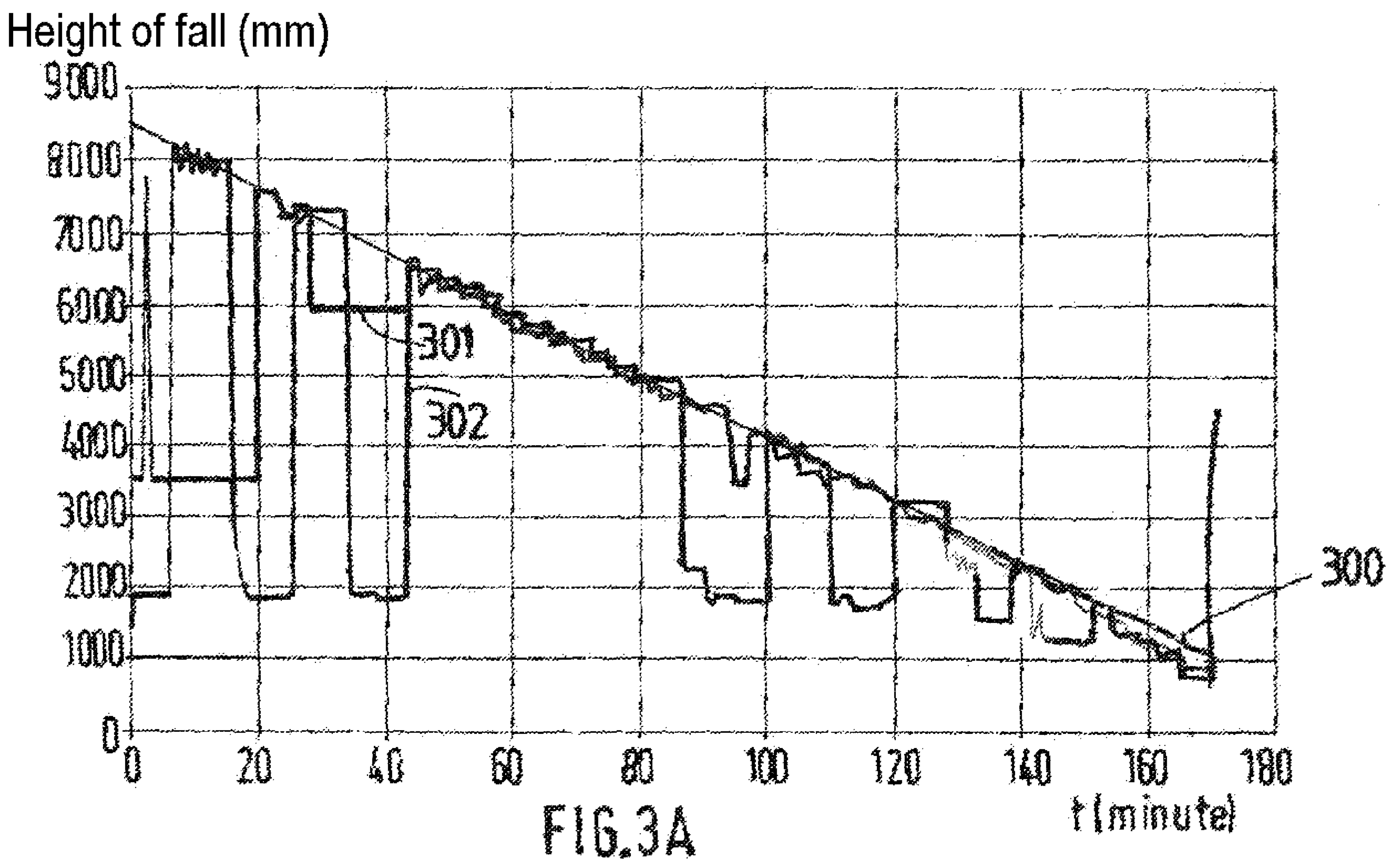
FIG. 3A is a graph showing values of theoretical height and values of measured height, as a function of time, in one embodiment of the invention.
Figure 3B:
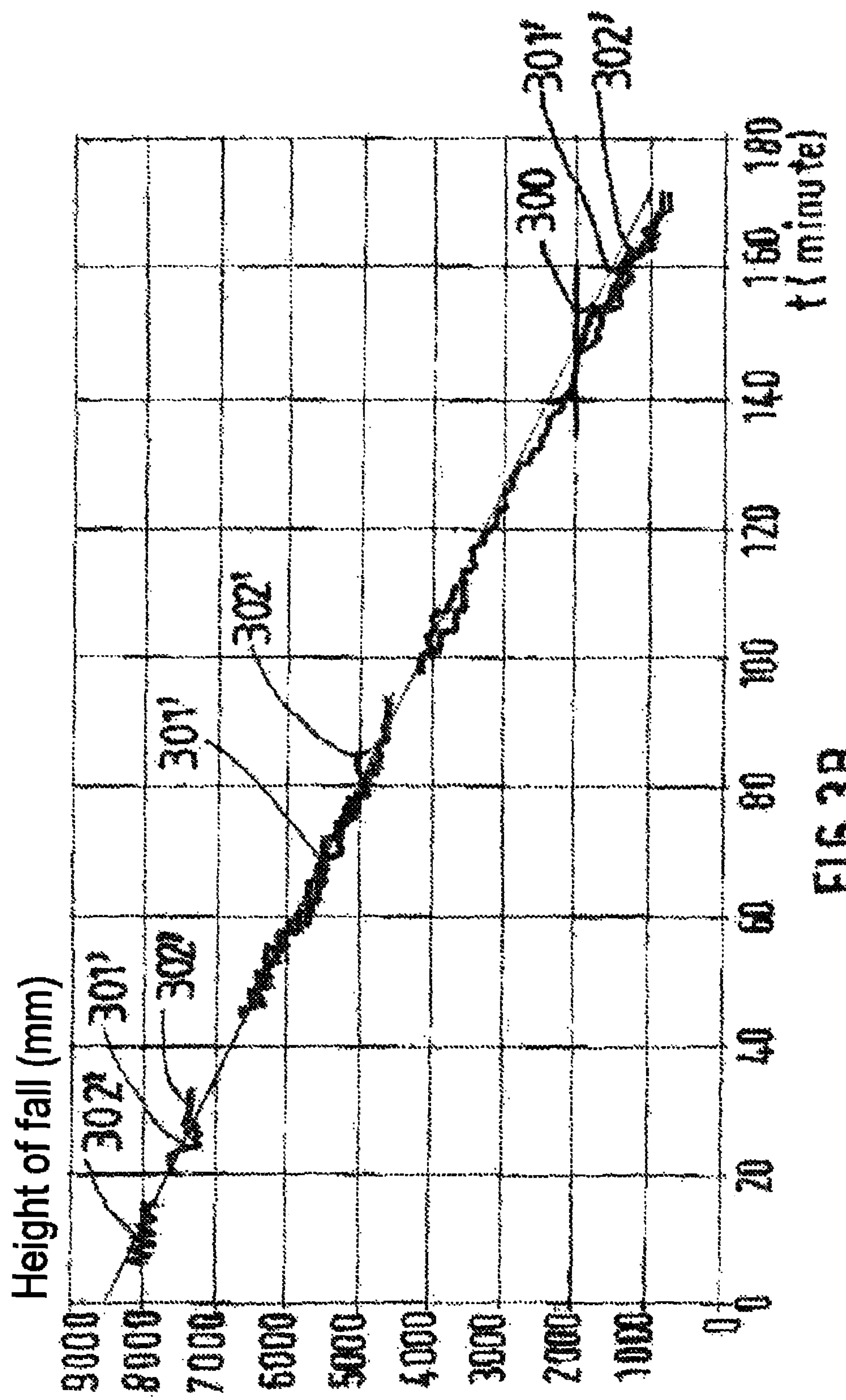
FIG. 3B is a graph showing values of theoretical height and values of filtered height, as a function of time, in one embodiment of the invention.

FIGS. 3A and 3B are graphs, the ordinate axis showing the values of height, in millimeters, and the abscissa axis showing values of time, in minutes. The instant t=0 corresponds to the start of charging.

A theoretical curve 300 has been obtained from an expected flow rate value and from a reactor diameter value, the reactor here being assumed to be cylindrical and of circular cross section. This curve is therefore a straight line.

With reference to FIG. 3A, two measurement curves 301, 302 are obtained from the values from two respective sensors and corresponding measurement instants. For the sake of legibility, the number of such measurement curves has been limited to two, but it will be appreciated that, in practice, the number of curves to be filtered may be higher, for example four or five.

As may be seen, these curves have numerous step-changes, during which the measured values may be well below the expected values. It may be assumed that these discontinuities are caused by the fact that the distance value is calculated from the signal corresponding to reflection off an obstacle rather than off the bed of catalyst.

The less clear the interior of the reactor, the more often such parasitic echoes may be detected.

FIG. 3B shows, in addition to the theoretical curve 300, two filtered curves 301', 302' obtained from values retained in step 212 of FIG. 2, and corresponding measurement instants. As may be seen, no step-change remains and the filtered curves are relatively close to the theoretical curve 300.

These filtered curves may be discontinuous, notably at the instants corresponding to step changes.

In an embodiment which has not been depicted, provision may be made for the missing values to be estimated by interpolation, from the filtered values.

The invention claimed is:

1. A method for managing the dense charging of a vessel with solid particles, comprising:

storing in a memory a model of an expected charging profile over a charging duration, dense charging the vessel with the solid particles.

during the charging, receiving, from at least one sensor, measured values of a parameter indicative of the height of a bed of solid particles charged into the vessel ($h_m(n)$), determining filtered values of the parameter indicative of the height ($h_f(n)$) from the measured values received and from the modeled charging profile, and transmitting the filtered vales to a charging control means so as to formulate, as a function of said filtered values, a signal for controlling the charging with solid particles.

2. The method as claimed in claim 1, in which a theoretical charging profile, modeled as a function of the shape of the vessel, the flow rate of solid particles and the type of solid particles charged is stored, and in which the filtered values of the parameter indicative of the height ($h_f(n)$) is determined by comparing received measured values ($h_m(n)$) with values from the theoretical charging profile ($h_{th}(n)$).

3. The method as claimed in claim 1, in which an experimental charging profile modeled on filtered values of the parameter indicative of the height determined at previous instants is stored, the filtered values of the parameter indicative of the height ($h_f(n)$) are determined by comparing received measured values ($h_m(n)$) with values from the experimental charging profile ($h_{MC}(n)$).

4. The method as claimed in claim 1, further comprising a step involving comparing at least one measured value of the parameter indicative of the height ($h_m(n)$) of the charging bed with at least one previous value of said parameter ($h_f(n-i)$).

5. The method as claimed in claim 1, comprising, for at least one received measured value, a step of comparing said received measured value ($h_m(n)$) with at least one previous measured value ($h_m(n-1)$), and in which said received measured value is ignored if it is found that the received measured values have evolved too little over a given period of time (T).

6. The method as claimed in claim 1, in which a plurality of sensors is provided, each sensor making it possible to measure one measured value of the parameter indicative of the height, and comprising, prior to charging:

receiving a plurality of measured values of the parameter indicative of the height from the plurality of respective sensors, determining, for at least one sensor, an offset value to be applied to the values from said sensor so that the plurality of corrected values are equal.

7. A non-transitory, computer program product comprising instructions for carrying out the steps of the method as claimed in claim 1 when said program is executed by a computer processor.

8. A device for managing dense charging of a vessel with solid particles, comprising:

a memory storing an expected charging profile modeled over a charging duration, receiving means for receiving from at least one sensor measured values of a parameter indicative of the height of a bed of solid particles charged into the vessel during the dense charging, processing means for determining filtered values of the parameter indicative of the height from the measured values received and from the modeled charging profile, and transmission means for transmitting the filtered values of the parameter indicative of the height to a charging control means so as to formulate a signal controlling the charging with solid particles.

9. A system for charging a vessel with solid particles, comprising a solid particles distribution device, at least one sensor for measuring a parameter indicative of the height of the bed of solid particles charged into the vessel, and a device for managing dense charging as claimed in claim 8.

10. The charging system as claimed in claim 9, in which said at least one sensor comprises at least one radar probe.

11. The charging system as claimed in claim 9, comprising a plurality of sensors.

* * * * *